United States Patent
Levi

(10) Patent No.: US 9,776,476 B1
(45) Date of Patent: Oct. 3, 2017

(54) SECURITY DEVICE FOR COMMERCIAL VEHICLES

(71) Applicant: ROM ACQUISITION CORPORATION, Belton, MO (US)

(72) Inventor: Avraham Y. Levi, Eagan, MN (US)

(73) Assignee: ROM ACQUISITION CORPORATION, Belton, MO (US)

( * ) Notice: Subject to any disclaimer, the term of this patent is extended or adjusted under 35 U.S.C. 154(b) by 0 days.

(21) Appl. No.: 15/158,730

(22) Filed: May 19, 2016

(51) Int. Cl.
*B60J 1/20* (2006.01)
*E06B 9/02* (2006.01)
*E06B 9/01* (2006.01)

(52) U.S. Cl.
CPC .............. *B60J 1/2094* (2013.01); *E06B 9/01* (2013.01); *E06B 9/02* (2013.01); *E06B 2009/015* (2013.01)

(58) Field of Classification Search
CPC .. B60J 1/2094; E06B 9/01; E06B 9/02; E06B 2009/015
USPC .............. 49/50, 57, 463, 465, 61, 62, 63, 67
See application file for complete search history.

(56) References Cited

U.S. PATENT DOCUMENTS

| | | | | |
|---|---|---|---|---|
| 2,864,648 A * | 12/1958 | Bland | ......................... | B60J 1/20 280/748 |
| 2,992,850 A * | 7/1961 | Schatzman | ................ | B60J 1/20 296/152 |
| 3,035,670 A * | 5/1962 | Whyte | ...................... | F16B 5/02 411/87 |
| 3,053,566 A * | 9/1962 | Allen | ...................... | B60J 1/2011 160/179 |
| 4,611,824 A * | 9/1986 | McIntosh | ................ | B60R 21/00 280/748 |
| 4,637,444 A * | 1/1987 | Tanner | ...................... | E06B 5/11 160/91 |
| 5,035,458 A | 7/1991 | Boensch | | |
| 5,343,668 A * | 9/1994 | Gonzalez | ................ | E04G 21/24 16/87 R |
| 6,224,479 B1 | 5/2001 | Iino | | |
| 2005/0050812 A1* | 3/2005 | Cameron | ................... | B60J 1/20 52/204.1 |
| 2005/0183339 A1* | 8/2005 | Schaaf | .................... | B60R 21/12 49/54 |
| 2007/0290106 A1* | 12/2007 | Spivey | ...................... | E06B 9/02 248/208 |
| 2009/0288352 A1* | 11/2009 | Wenrick | .................... | E06B 9/02 52/202 |
| 2013/0269271 A1* | 10/2013 | Webb | ........................ | E06B 9/02 52/202 |
| 2015/0375152 A1* | 12/2015 | Simmons | .................. | E06B 9/01 55/491 |
| 2016/0280047 A1* | 9/2016 | Agnew | .................. | B60J 1/2094 |

\* cited by examiner

*Primary Examiner* — Gregory Strimbu
(74) *Attorney, Agent, or Firm* — Nikolai & Mersereau, P.A.; Thomas J. Nikolai

(57) ABSTRACT

A security device for a cargo van comprises a sheet metal grill stamped or laser cut to exhibit a plurality of regularly spaced apertures therethrough and surrounded by a solid border having a plurality of notches formed inward of the border into which are fitted clamp members for securing the grill in place against a window of the cargo van to inhibit break-ins and theft of articles carried by the van. The clamp members include U-shaped sockets adapted to cooperate with the notches formed in the border and base members for secure attachment of the clamp members to a frame of the window using self-tapping screws.

5 Claims, 4 Drawing Sheets

SECURITY DEVICE FOR COMMERCIAL VEHICLES

CROSS REFERENCE TO RELATED APPLICATIONS

None

STATEMENT OF GOVERNMENT SPONSORSHIP

None

BACKGROUND OF THE INVENTION

I. Field of the Invention

This invention relates generally to a security device for commercial vehicles and, more particularly, to a grill assembly mounted to the frame of a window on the interior of the vehicle body to prevent ingress and theft of materials that may be present within the vehicle.

II. Discussion of the Prior Art

Commercial vans sometimes referred to as cargo vans are commonly used to transport goods such as tools and other commodities of value between a company's plant and a work site. Because such articles can be of significant value, they attend to attract the criminal element. Commercial vans are somewhat vulnerable in that they generally have doors at the rear of the vehicle that are adapted to swing open about vertical axis to provide access to the cargo space. These doors typically will include stationary windows mounted in frames inset into the door panels. These windows can be easily broken by a hammer blow allowing access to the interior of the cargo compartment.

The prior art is replete with protective grills for vehicle windows, but for the most part, they are unsightly, difficult to install and result in significant damage to the vehicle body. See, for example, the Boensch U.S. Pat. No. 5,035,458 and the references cited in that document.

It is accordingly a principle object of the present invention to provide a security device for commercial vans to inhibit break-ins of the cargo compartment by thieves which is easy to install and which does not detract from the vehicle's appearance.

SUMMARY OF THE INVENTION

The foregoing objects and advantages of the invention are achieved by providing a grill member comprising a generally rectangular sheet shaped to conform to the shape of a window on the van's door. The grill member comprises a stamped or laser cut metal plate having a pattern of apertures extending through its thickness dimension, the grill further including a solid border. The grill is held directly against or closely parallel to the window glass on the interior side of the door by specially designed clamp members that cooperate with rectangular cut-outs formed in the border of the grill. The clamp members include a generally U-shaped socket having a pair of spaced-apart legs between which the border of the grill is adapted to fit. The clamp member further includes a plate pivotally coupled to a bottom portion of the U-shaped socket by a hinge. An elastomeric base underlies the plate and hinge. The plate and base are adapted to be affixed to the door frame surrounding the window by a self-tapping screw fastener that extends through an aperture in the plate and elastomeric base. The elastomeric base is shaped such that tightening of the self-tapping screw fastener displaces the U-shaped socket deeper into the rectangular cut-outs formed in the grill border to the point where lateral shifting of the grill member is prevented.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
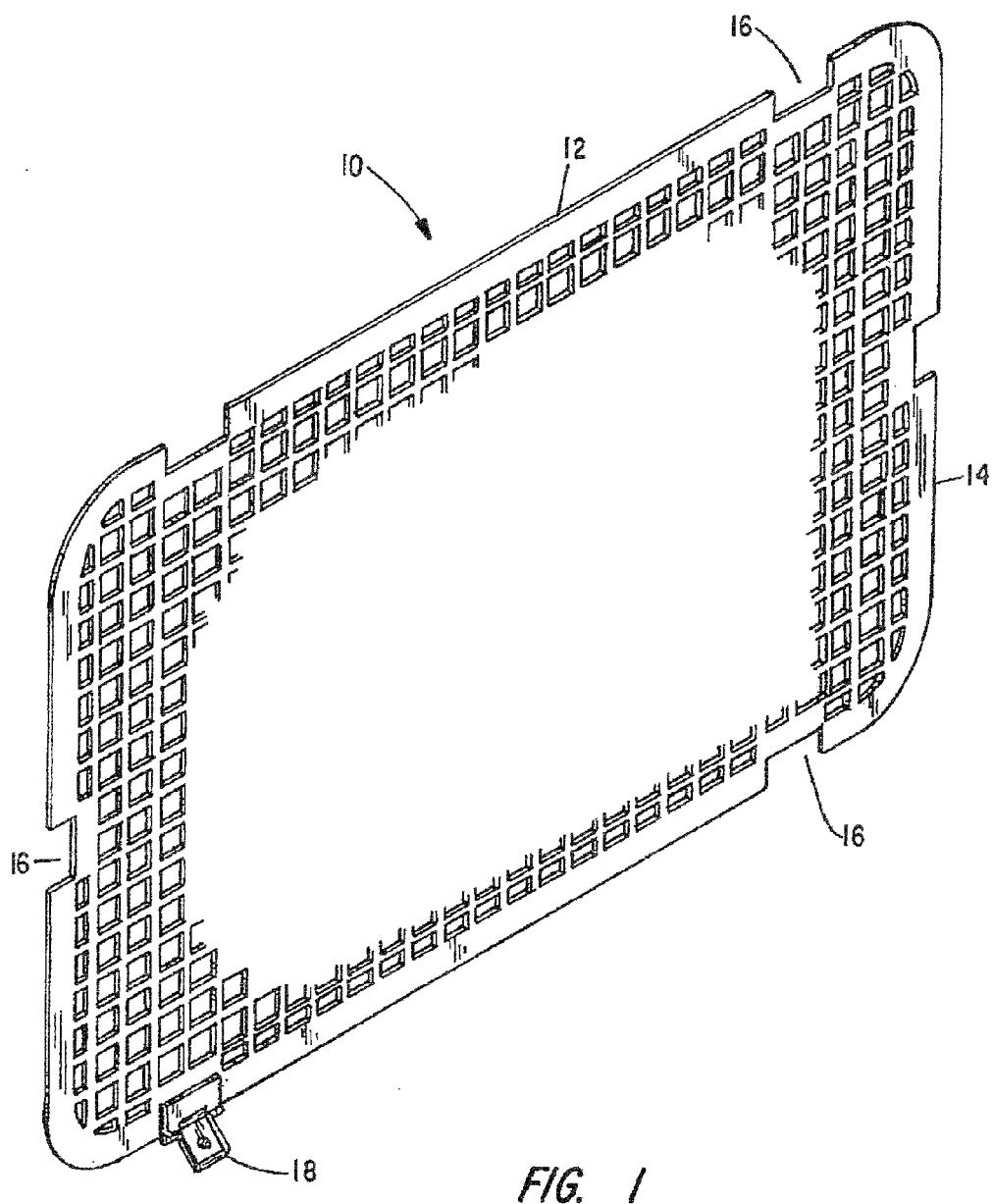
FIG. 1 is a perspective view of a security device comprising a preferred embodiment of the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 6:
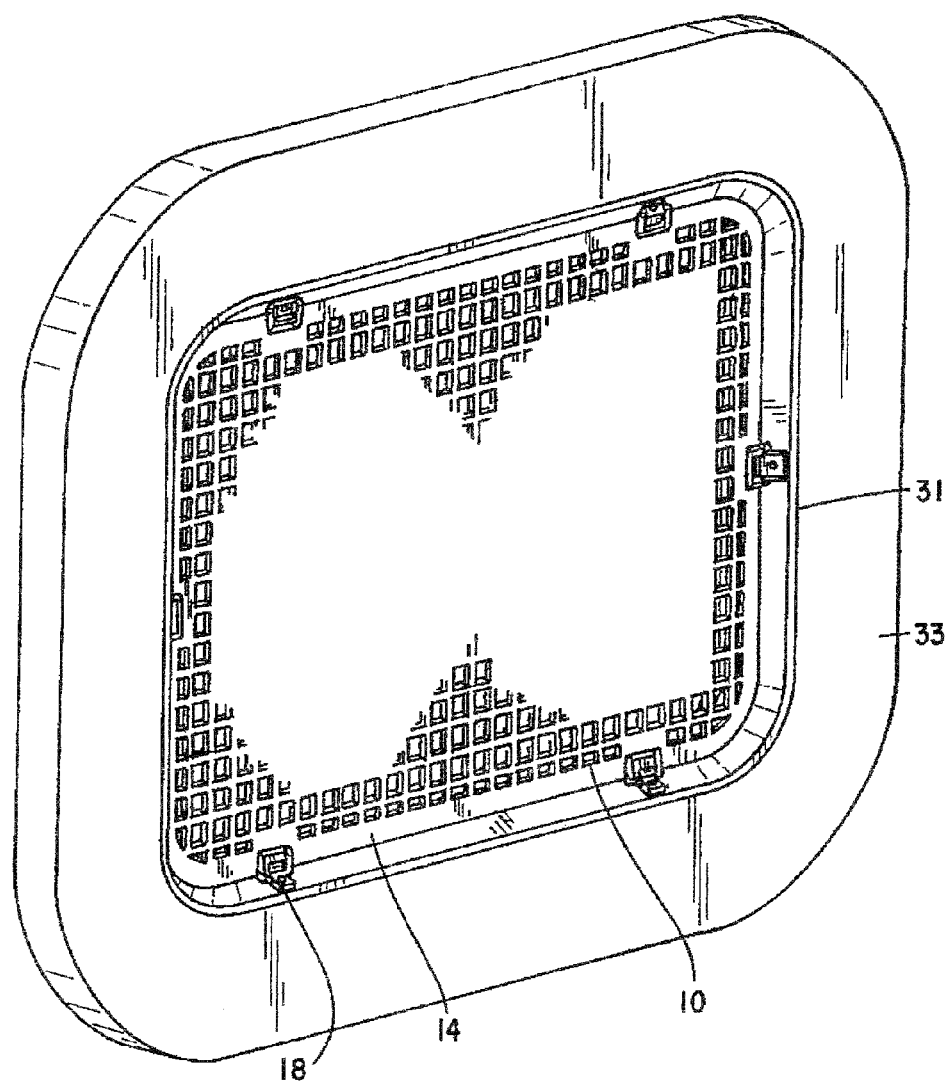
FIG. 6 shows the security grill installed in a vehicle window frame.

Referring to FIG. 1, there is shown a perspective view of the security device comprising a preferred embodiment of the present invention. It is indicated generally by numeral 10 and comprises a generally rectangular plate whose shape is made to conform to the shape of the vehicle window to be secured and as best seen in FIG. 6. It will typically be formed from sheet steel or aluminum in a stamping or laser cutting operation to include a plurality of regularly spaced apertures through its thickness dimension and surrounded by a solid or imperforate border 12. Without limitation, the sheet may be $1/8^{th}$ inch in thickness and, while in the figures the plurality of apertures are shown as being rectangular, they also may be circular, oval or other suitable shape.

Formed in the peripheral edge 14 of the border 12 are a plurality of inwardly extending cut-outs or notches 16, each of which is to be fitted with a clamping device serving as a means of affixing the grill to the vehicle's window frame (FIG. 6). One such clamping device is shown in FIG. 1 and identified by numeral 18.

Figure 2:
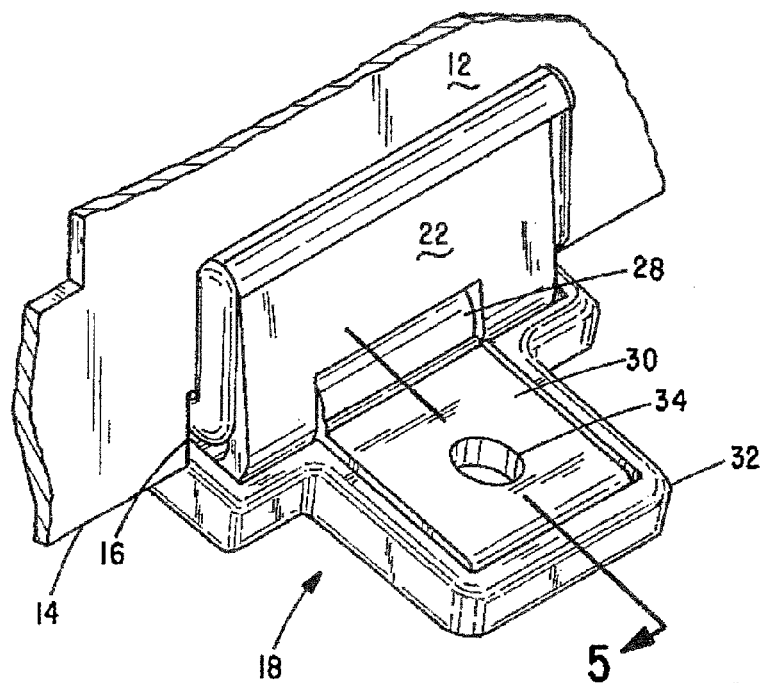
FIG. 2 shows an enlarged segment of the security device of FIG. 1.
Figure 3:
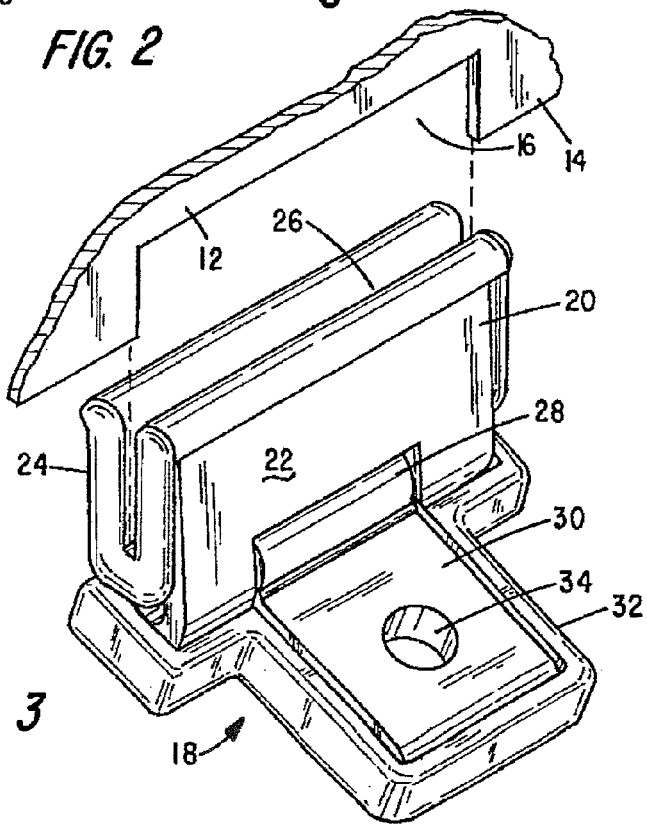
FIG. 3 is an exploded view of FIG. 2.

FIG. 2 is an enlarged partial view of the portion of the screen of FIG. 1 to which the clamping device 18 of FIG. 1 is affixed. As seen in FIG. 2 and the exploded view of FIG. 3, fitted into each of the cut-outs or notches 16 formed in the border of the screen 10 is a clamp member that comprises a generally U-shaped socket 20 having a pair of legs 22 and 24 having an elastomeric covering layer 26 on each. The U-shaped socket 20 is connected by a hinge 28 to a flat plate 30 and an elastomeric base 32 underlies the plate 30 and the hinge 28, as illustrated. An aperture 34 extends through the plate 30 and the base 32 and is adapted to receive a self-tapping screw for attaching the clamp member 18 to a hole drilled through the vehicle's window frame 31 (FIG. 6).

Figure 4:
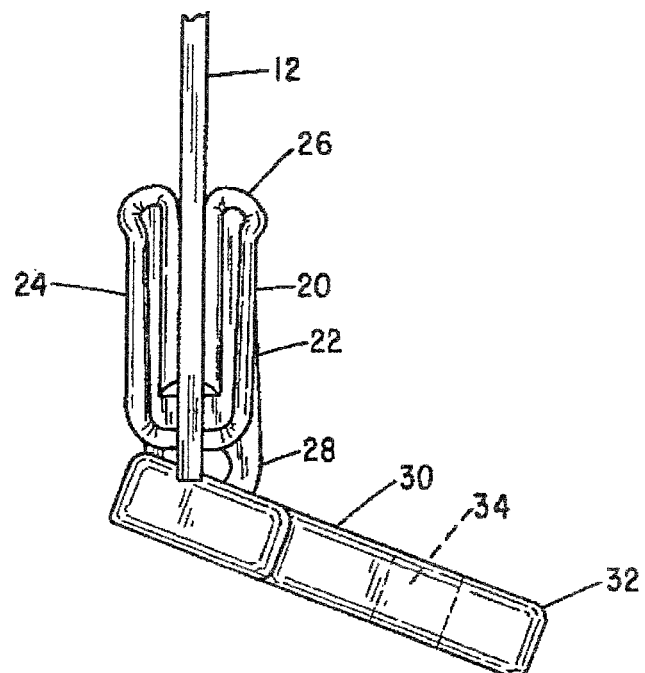
FIG. 4 is a side elevation of the grill clamp.

As is apparent from the side view of FIG. 4, due to the presence of the hinge 28, the plate 30 and base 32 may be set at an appropriate angle to accommodate variations in the shape of the vehicle's body or door framework 33 surrounding the window frame 31, thereby facilitating the ability to rigidly mount the security devices with respect to the vehicle's windows.

Figure 5:
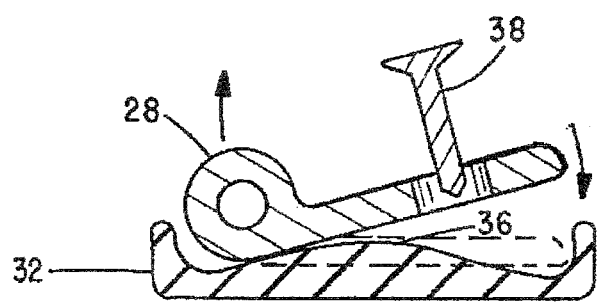
FIG. 5 is a cross-sectional view taken along the line 5-5 in FIG. 2.

FIG. 5 is a cross section taken through the plate 30 and the base 32 and showing a portion of the hinge 28. The upper surface of the base 32 has a convex contour as at 36 and it is to be observed that when the self-tapping screw 38 is tightened down, it will cause the hinge 28 to elevate, thereby raising the socket 20 to the point where the side edges defining the notch 16 will be made to abut the clamp member and preventing lateral movement of the screen or grill 10 relative to the clamp members 18. This arrangement is best seen in the large perspective view of FIG. 2.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A security device for a cargo van, said security device comprising:
    a) a metal grill member comprising a rigid planar plate having a pattern of apertures extending through a Thickness dimension thereof and said plate shaped to conform to and adapted to fit within a frame of an access door window of the cargo van, said plate including a border that includes a plurality of spaced-apart, rectangular, cut-outs each having a predetermined width dimension and extending inward from a peripheral edge of the border; and
    b) a plurality of clamps attaching the grill member to the frame of the window, said clamps each comprising
        (i) a U-shaped member with a pair of spaced-apart legs between which the border is adapted to fit, the U-shaped member having a width adapted to fit into one of said rectangular cut-outs,
        (ii) a further plate pivotally coupled to a bottom portion of the U-shaped member by a hinge, and
        (iii) an elastomeric base adapted to be affixed to said window frame by a self tapping screw fastener extending through aligned apertures in the further plate and in the elastomeric base.

2. The security device of claim 1 wherein each of the elastomeric bases is shaped such that when a respective one of the self-tapping screw fasteners of a respective one of the U-shaped members within an associated one of said rectangular cut-outs is tightened, lateral shifting of the grill member relative to the window frame is prevented.

3. The security device of claim 2 wherein each of the elastomeric bases includes a convex segment.

4. The security device of claim 1 and further including elastomeric linings on the legs of the U-shaped members.

5. The security device of claim 1 wherein the access door is a rear access door of the cargo van.

* * * * *